(12) United States Patent
Flikkema (10) Patent No.: US 10,176,009 B1
(45) Date of Patent: Jan. 8, 2019

(54) SYSTEM AND METHODS FOR OPTIMIZING ENERGY EFFICIENCY IN PROGRAMMABLE DEVICES

(71) Applicant: Arizona Board of Regents for Northern Arizona Univ

(72) Inventor: Paul G. Flikkema, Flagstaff, AZ (US)

(73) Assignee: Arizona Board of Regents acting for and on behalf of Northern Arizona University, Flagstaff, AZ (US)

( * ) Notice: Subject to any disclaimer, the term of this patent is extended or adjusted under 35 U.S.C. 154(b) by 151 days.

(21) Appl. No.: 15/284,439

(22) Filed: Oct. 3, 2016

Related U.S. Application Data (63) Continuation of application No. 14/102,369, filed on Dec. 10, 2013, now Pat. No. 9,459,685.

(60) Provisional application No. 61/735,363, filed on Dec. 10, 2012.

(51) Int. Cl.
*G06F 9/455* (2018.01)

(52) U.S. Cl.
CPC ...... *G06F 9/45558* (2013.01); *G06F 9/45504* (2013.01); *G06F 2009/45583* (2013.01)

(58) Field of Classification Search
CPC .................. G06F 9/45558; G06F 9/45504
See application file for complete search history.

(56) References Cited

U.S. PATENT DOCUMENTS

| | | | |
|---|---|---|---|
| 6,086,628 A | 7/2000 | Dave et al. | |
| 8,799,693 B2 * | 8/2014 | Vick | G06F 1/32 713/320 |
| 9,459,685 B1 * | 10/2016 | Flikkema | G06F 1/3206 |
| 2005/0240786 A1 * | 10/2005 | Ranganathan | G06F 1/3215 713/320 |
| 2005/0289367 A1 * | 12/2005 | Clark | G06F 1/26 713/300 |
| 2006/0031836 A1 | 2/2006 | Brown et al. | |
| 2006/0069938 A1 | 3/2006 | Olszewski et al. | |
| 2007/0192641 A1 | 8/2007 | Nagendra et al. | |
| 2008/0059823 A1 | 3/2008 | Balatsos et al. | |

(Continued)

OTHER PUBLICATIONS

"Energy-Aware System Design for Wireless Multimedia," published by the Computer Society, #1530-1591/04, dated 2004.

(Continued)

*Primary Examiner* — Vincent H Tran
(74) *Attorney, Agent, or Firm* — IPTechLaw

(57) ABSTRACT

A system for optimizing energy efficiency of an embedded system. A hardware abstraction layer (HAL) is coupled to hardware of an embedded system. An energy hardware abstraction layer (eHAL) couples to the hardware and to the HAL. A hypervisor couples to the HAL and to the eHAL. One or more applications couple to the hypervisor, the HAL and the eHAL. The eHAL measures energy use of the embedded system, constructs a model of energy use of the embedded system and, using the model, determines how to one of reduce and minimize energy use of the embedded system. The hypervisor is configured to alter one or more hardware parameters to one of reduce and minimize energy use of the embedded system as the embedded system performs one or more tasks. In implementations a real time operating system (RTOS) is coupled to the one or more applications and to the hypervisor.

17 Claims, 4 Drawing Sheets

(56) References Cited

U.S. PATENT DOCUMENTS

| | | | |
|---|---|---|---|
| 2009/0254767 A1* | 10/2009 | Ford | G06F 1/3203 713/320 |
| 2011/0022870 A1 | 1/2011 | McGrane et al. | |
| 2011/0106286 A1* | 5/2011 | Lupetini | G05B 13/026 700/103 |
| 2011/0213997 A1* | 9/2011 | Kansal | G06F 1/3203 713/324 |
| 2012/0017100 A1 | 1/2012 | Petit et al. | |
| 2013/0080805 A1 | 3/2013 | Vick et al. | |
| 2013/0124885 A1* | 5/2013 | Davis | G06F 1/3206 713/320 |
| 2013/0311803 A1* | 11/2013 | Wang | G06F 1/3212 713/320 |

OTHER PUBLICATIONS

"An Architecture for Energy Management in Wireless Sensor Networks," published by UC Berkeley EECS Dept., Berkeley, CA 94720, Stanford CS Dept., Stanford, CA 94305, and Arch Rock Corp., San Francisco, CA 94105 (published in 2007).

"A Software Architecture for Building Power Aware Real Time Operating Systems," by Department of Information of Information and Computer Science, University of California, Irvine and Department of Electrical Engineering, University of California, Los Angeles, Technical Report #02-07, dated Mar. 14, 2002.

"Energy Optimization of Distributed Embedded Processors by Combined Data Compression and Functional Partitioning" by Jinfeng Liu, Pai H. Chou, Center for Embedded Computer Systems, University of California, Irving, CA 92697-2625 (published 2004).

"A Framework for Estimating and Minimizing Energy Dissipation of Embedded HW/SW Systems," by Yanbing Li, Department of Electrical Engineering, Princeton University, Princeton, NJ 08544, and Jorg Henkel, C&C Research Laboratories, NEC USA, 4 Independence Way, Princeton, NJ 08540, DAC 98, Jun. 15-19, 1998, San Francisco, CA.

"Prospector: Multiscale Energy Measurement of Networked Embedded Systems with Wideband Power Signals," by Kenji R. Yamamoto and Paul G. Flikkema, Northern Arizona University, Flagstaff, AZ 86001 (published 2009).

"Master of Engineering Thesis," by Kenji R. Yamamoto, "Manipulation of Energy Consumption in Time-Triggered Embedded Systems with Static Schedules," published by Northern Arizona University, May 2011.

"Dynamic Programming and Optimal Control, vol. II, 4th Edition, Approximate Dynamic Programming," by Athena Scientific (2007).

"Markov Decision Processes: Discrete Stochastic Dynamic Programming," Martin L. Puterman, by Wiley (2005).

Freescale MQX Real-Time Operating System (RTOS), www.freescale.com/webapp/sps/site/overview.jsp?code=MQXRTOS, last accessed Dec. 11, 2013, published at least as early as Dec. 4, 2012.

AVIX The Hybrid RTOS, www.avix-rt.com/Products/Energy_Saving/energy_saving.html, last accessed Dec. 11, 2013, published at least as early as Dec. 5, 2012.

Wind River VxWorks RTOS, www.windriver.com/products/vxworks, last accessed Dec. 11, 2013, published at least as early as Dec. 5, 2012.

Nucleus RTOS (Real-time Operating System), www.mentor.com/embedded-software/nucleus, last accessed Dec. 11, 2013, published at least as early as Dec. 5, 2012.

What is Q-Kernel, Quasarsoft, www.quasarcoft.com/products.html, last accessed Dec. 11, 2013, published at least as early as Dec. 5, 2012.

"WN4118: OS Overview," Junfeng Yang.

* cited by examiner

SYSTEM AND METHODS FOR OPTIMIZING ENERGY EFFICIENCY IN PROGRAMMABLE DEVICES

CROSS REFERENCE TO RELATED APPLICATIONS

This application is a continuation application of the earlier U.S. Utility Patent Application to Paul G. Flikkema entitled "System and Methods for Optimizing Energy Efficiency in Programmable Devices," application Ser. No. 14/102,369, filed Dec. 10, 2013, the disclosure of which is hereby incorporated entirely herein by reference.

GOVERNMENT LICENSE RIGHTS

This application was made with government support under CNS-0540414 awarded by the National Science Foundation. The government has certain rights in the invention.

BACKGROUND

1. Technical Field

Aspects of this document relate generally to systems and methods for energy analysis and optimization of embedded systems.

2. Background

Various types of embedded systems exist for performing various functions. Some embedded systems must operate for long periods of time on limited amounts of electrical energy such as using a battery that may not be able to be replaced for many years, if ever. Methods have been implemented in the past to optimize the energy use of the embedded system to reduce its energy consumption so that the operational life of the embedded system on limited electrical energy may be maximized. Conventionally, such optimization methods have been performed by a programmer prior to deployment of an embedded system as part of application programming.

SUMMARY

Implementations of a system for optimizing energy efficiency for an embedded system may include: a hardware abstraction layer (HAL) coupled to hardware of the embedded system, the HAL configured to arrange control and direct the operation of one or more components of hardware of the embedded system using a processor comprised in the embedded system; an energy hardware abstraction layer (eHAL) coupled to the hardware of the embedded system and to the HAL; a hypervisor coupled to the HAL and to the eHAL; and one or more applications, the one or more applications coupled to the hypervisor, the HAL and the eHAL, the one or more applications configured to use the processor to carry out one or more desired functions of the hardware of the embedded system; wherein one of the eHAL and the hypervisor is configured to measure electrical energy use of the embedded system, generate a model of electrical energy use of the embedded system and, using the model, determine how to one of reduce and minimize electrical energy use of the embedded system; and wherein the hypervisor is configured to alter one or more hardware parameters to one of reduce and minimize electrical energy use of the embedded system as the embedded system performs the one or more desired functions of the hardware in response to instructions from the processor executing the one or more applications.

Implementations of the system may include one, all, or any of the following:

A real time operating system (RTOS) may be coupled only to the one or more applications and to the hypervisor.

The eHAL may include a software library that is available to the RTOS.

The eHAL may include a software library that is available to the one or more applications.

Implementations of a method of optimizing energy efficiency for an embedded system may include: using an energy hardware abstraction layer (eHAL) of an embedded system to measure power consumption of the embedded system during execution of the embedded system's tasks, the embedded system including: hardware, a hardware abstraction layer (HAL) coupled to the hardware, the eHAL coupled to the hardware and to the HAL, a hypervisor coupled to the HAL and to the eHAL, and at least one application coupled to the hypervisor and to the HAL and the eHAL; calculating, using one of the eHAL and the hypervisor, from the measured power consumption, electrical energy use of the embedded system; generating, using a processor coupled to the embedded system and using one of the eHAL and the hypervisor, a model of electrical energy use of the embedded system, the model relating electrical energy use of the embedded system for tasks performed by the embedded system to values of hardware parameters of the embedded system; and storing the model in the eHAL for use by the hypervisor.

Implementations of the method may include one, all, or any of the following:

Providing a real time operating system (RTOS) coupled only to the at least one application and to the hypervisor.

Modifying, using the processor coupled to the embedded system and using one of the eHAL and the hypervisor, the model of electrical energy use of the embedded system in response to determining a difference between a predicted electrical energy use based upon the model and a calculated electrical energy use of the embedded system.

Implementations of a method of real time energy efficiency optimization for an embedded system may include: using an energy hardware abstraction layer (eHAL) of an embedded system to measure power consumption of the embedded system during execution of the embedded system's tasks, the embedded system including: hardware, a hardware abstraction layer (HAL) coupled to the hardware, the eHAL coupled to the hardware and to the HAL, a hypervisor coupled to the HAL and to the eHAL, a real time operating system (RTOS) coupled only to the hypervisor and at least one application, the at least one application coupled to the hypervisor and to the RTOS, the HAL and the eHAL; calculating, using one of the eHAL and the hypervisor, from the measured power consumption, electrical energy use of the embedded system; generating, using a processor coupled to the embedded system and using one of the eHAL and the hypervisor, a model of electrical energy use of the embedded system, the model relating electrical energy use of the embedded system for tasks performed by the embedded system to values of hardware parameters of the embedded system; storing the model in the eHAL for use by the hypervisor; in response to the embedded system being required to perform a specific task, determining, with the hypervisor, using the model of electrical energy use, optimized hardware parameter settings to one of reduce and minimize electrical energy use of the embedded system while performing the specific task; and using one of the hypervisor and the eHAL, implementing the optimized hardware parameter settings.

Implementations of the method may include one, all, or any of the following:

Determining, using the hypervisor, whether one or more optimization steps is likely to result in a net reduction in electrical energy use of the embedded system, taking into account an amount of electrical energy required to implement the one or more optimization steps.

Comparing, with one of the eHAL and the hypervisor, a predicted electrical energy use with a calculated electrical energy use of the embedded system.

In response to comparing the predicted electrical energy use with the calculated electrical energy use of the embedded system, modifying the model using one of the eHAL and the hypervisor.

In response to comparing the predicted electrical energy use with the calculated electrical energy use of the embedded system, determining additional optimized hardware parameter settings to one of reduce and minimize electrical energy use of the embedded system and, using one of the eHAL and the hypervisor, implementing the additional optimized hardware parameter settings.

The hardware parameters may be selected from the group consisting of power supply to one or more hardware subsystems, supply voltage to the one or more hardware subsystems, presence of clock signal that drives subsystem operation, enablement or disablement of clock source hardware, clock frequency, any parameter that affects power consumption of the one or more hardware subsystems, and any combination thereof.

Measuring, using the eHAL, power consumption of the embedded system during execution of the embedded system's tasks, may include sensing activity of voltage regulation circuitry that powers the embedded system; measuring, using the eHAL, power consumption of the embedded system during execution of the embedded system's tasks, may include estimating the power consumption; and calculating, using one of the eHAL and the hypervisor, from the measured power consumption, electrical energy use of the embedded system, may include calculating electrical energy use using one or more measured times that the embedded system takes to perform one or more tasks.

In response to a change in the embedded system's operating environment: automatically re-measuring, using the eHAL, power consumption of the embedded system during execution of the embedded system's tasks; re-calculating, using one of the eHAL and the hypervisor, from the re-measured power consumption, electrical energy use of the embedded system; determining, using one of the eHAL and the hypervisor, additional optimized hardware parameter settings to one of reduce and minimize electrical energy use of the embedded system; and, using one of the eHAL and the hypervisor, implementing the additional optimized hardware parameter settings.

Implementing the optimized hardware parameter settings may include storing data values in registers in memory included in the embedded system.

Determining, with the hypervisor, optimized hardware parameter settings may include determining optimized hardware parameters settings within one or more constraints.

The one or constraints may include one of accomplishing the embedded system's tasks within a given time limit and requiring one or more peripherals of the embedded system to remain powered.

Making a request, with the at least one application, directly to the hypervisor.

One of generating the model of electrical energy use of the embedded system and determining the optimized hardware parameter settings may include dynamic programming.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended systems and methods for optimizing energy efficiency in programmable devices will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such systems and methods for optimizing energy efficiency in programmable devices, and implementing components and methods, consistent with the intended operation and methods.

Figure 1:
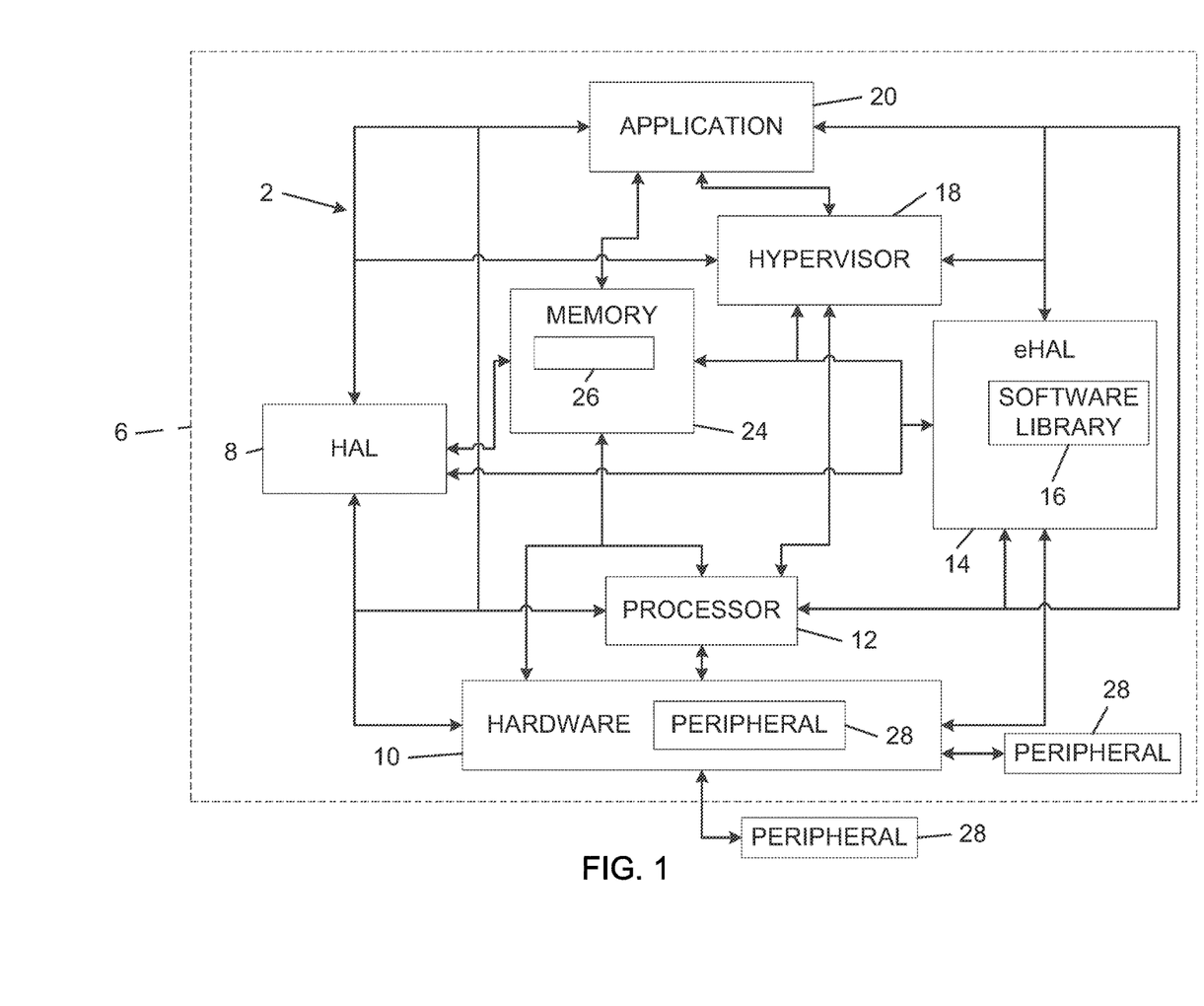
FIG. 1 is a block diagram of a first implementation of a system for optimizing energy efficiency of an embedded system.
Figure 2:
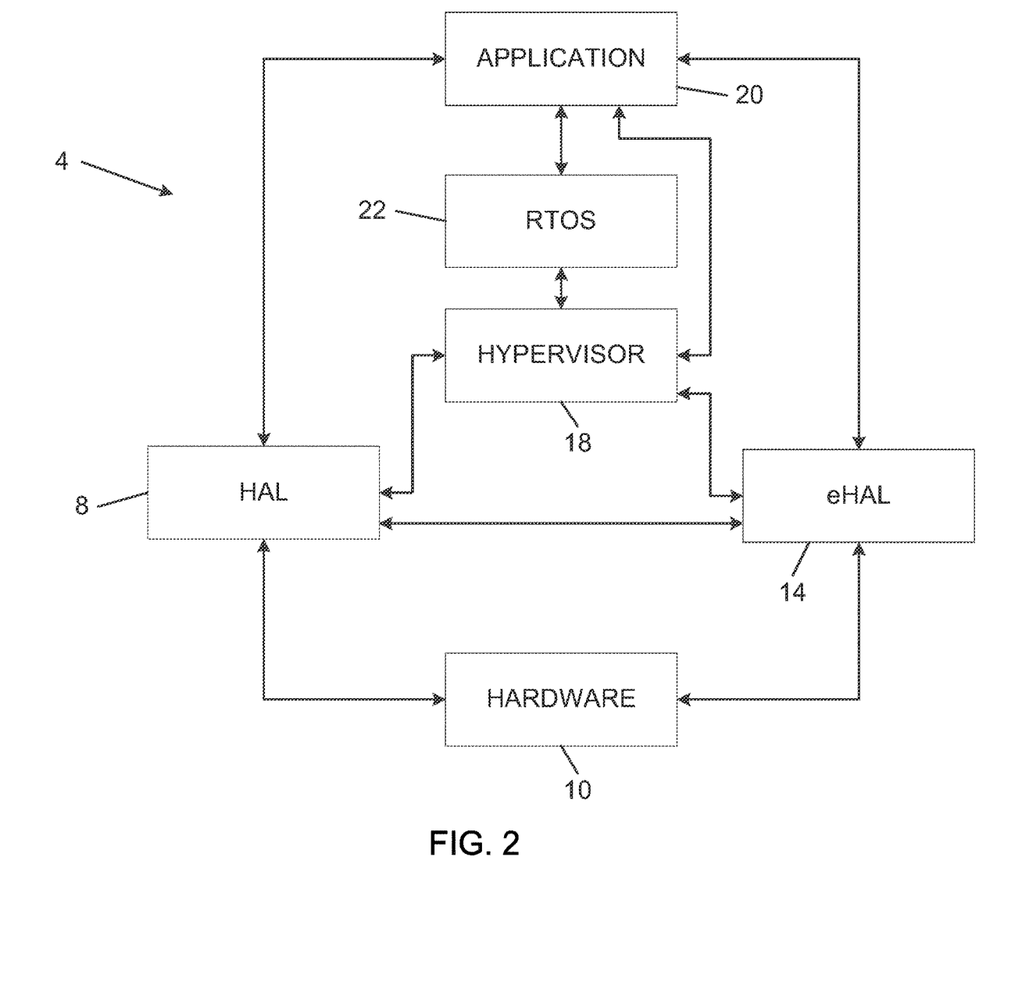
FIG. 2 is a block diagram of a second implementation of a system for optimizing energy efficiency of an embedded system.

Referring now to FIG. 1, a first implementation of a system 2 for optimizing energy efficiency of an embedded system 6 is illustrated. As illustrated, the system 2 includes a hardware abstraction layer (HAL) 8, an energy hardware abstraction layer (eHAL) 14, a hypervisor 18, hardware 10 and one or more applications 20. In implementations the hardware 10 of the embedded system 6 includes one or more internal or external peripherals 28. One or more processors 12 may be included and one or more memories 24, including registers 26, may be included. The eHAL 14 may include a software library 16. Referring to FIG. 2, in implementations a system 4 for optimizing energy efficiency of an embedded system 6 may also include a real time operating system (RTOS) 22.

Referring to FIGS. 1 and 2 (FIG. 2 illustrating a second implementation of the system 4), in various implementations, hardware 10 of an embedded system 6 may be coupled to one or more internal or external peripherals 28 which may reside, by non-limiting example, in the hardware 10, or coupled to the hardware 10 and in the embedded system 6, or coupled to the hardware 10 and external to the embedded system 6 (on-chip versus off-chip). Peripherals 28 may include, by non-limiting example: a timer; a chime; a pressure sensor; a temperature sensor; a mechanical device; a pump in a medical device; a radio (e.g., for Wi-Fi, telephone, or other telecommunication over a telecommunication channel); and the like.

In implementations various elements of the system 2 or 4 may be interconnected either directly or through another element of the system. By non-limiting example, in various implementations, the hardware 10 may be directly coupled to the HAL 8 and the eHAL 14; the HAL 8 may be directly coupled to the hardware 10, the eHAL 14, the hypervisor 18, and the one or more applications 20; the eHAL 14 may be directly coupled to the hardware 10, the HAL 8, the hypervisor 18, and the one or more applications 20; the hypervisor 18 may be directly coupled to the HAL 8, the eHAL 14, and the one or more applications 20; and the one or more applications 20 may be directly coupled to the HAL 8, the hypervisor 18 and the eHAL 14.

Referring to FIG. 2, in various implementations the following interconnectedness may be present: the hardware 10 may be directly coupled to the HAL 8 and the eHAL 14; the HAL 8 may be directly coupled to the hardware 10, the eHAL 14, the hypervisor 18 and the one or more applications 20; the eHAL 14 may be directly coupled to the hardware 10, the HAL 8, the hypervisor 18 and the one or more applications 20; the hypervisor 18 may be directly coupled to the HAL 8, the eHAL 14, the RTOS 22 and the one or more applications 20; the RTOS 22 may be directly coupled only to the hypervisor 18 and the one or more applications 20; and the one or more applications 20 may be directly coupled to the HAL 8, the eHAL 14, and the hypervisor 18.

Referring again to FIG. 1, in various implementations the embedded system 6 includes one or more processors 12 and one or more memories 24. In particular implementations a memory 24 may include one or more registers 26. The processor 12 may be directly or indirectly coupled to other elements of the system 2 or 4. By non-limiting example, the processor 12 may be directly coupled to the hardware 10, the HAL 8, the eHAL 14, the memory 24, the hypervisor 18, and the one or more applications 20. In various implementations the memory 24 may be directly or indirectly coupled to other elements of the system 2 or 4. By non-limiting example, the memory 24 may be directly coupled to the processor 12, the hardware 10, the HAL 8, the one or more applications 20, the hypervisor 18, and the eHAL 14.

Any and all of the elements, components and sub-components of the system 2 or 4 may be included in a single embedded system or may be carried out through various hardware and software components using a plurality of embedded systems or components thereof. By non-limiting example, in implementations the HAL 8, eHAL 14, hypervisor 18 and the one or more applications 20 could all be composed of data elements stored in the memory 24. In other implementations the eHAL 14 and the hypervisor 18 could be composed of data elements stored in one or more separate memories that are coupled to one or more elements of an embedded system. In various implementations hypervisor 18 and eHAL 14 could include hardware components. Any number of the elements of the system 2 or 4 could be implemented as standalone elements (such as with each of the eHAL 14, hypervisor 18 and/or other elements each including its own processor and/or memory and/or hardware and/or software), or one or more elements could be implemented using the same hardware, processor 12 and memory 24 elements, and the like. In particular implementations, the system 2 or 4 is implemented on a single integrated circuit or microcontroller (MCU).

The hypervisor 18 and/or eHAL 14 may be implemented as software, hardware, firmware, and/or any combination thereof. By non-limiting example, the hypervisor 18 and/or eHAL 14 may be implemented as firmware in any MCU marketed under the trade names ATMEGA, XMEGA, ARM CORTEX or MEGAAVR by ATMEL, INC., of San Jose, Calif., or in any MCU marketed under the trade names HC08, HC12, COLDFIRE+, ARM CORTEX or KINETIS by FREESCALE SEMICONDUCTOR, INC., of Austin, Tex., or in any MCU marketed under the trade names PIC18, PIC24, PIC32, MIPS or DSPIC by MICROCHIP TECHNOLOGY of Chandler, Ariz., or in any MCU marketed under the trade names MSP430, CC1101, CC2538, C2000, TIVA, or ARM CORTEX by TEXAS INSTRUMENTS, Inc., of Dallas, Tex., or in any MCU marketed under the trade names SI1000, EFM32 or ARM CORTEX by SILICON LABORATORIES, Inc., of Austin, Tex. Also, by non-limiting example, the hypervisor 18 and/or eHAL 14 may be implemented as hardware or firmware in any field-programmable gate array (FPGA) marketed under the trade names SPARTAN, ARTIX, KINTEX, ZYNQ or VIRTEX by XILINX, INC. of San Jose, Calif. or in any FPGA marketed under the trade names STRATIX, ARRIA, CYCLONE, MAX, HARDCOPY or NIOS by ALTERA CORPORATION of San Jose, Calif.

In various implementations the hardware 10 and/or peripherals 28 may include physical devices including, by non-limiting example, sensors, transducers, interfaces, radio transceivers and/or receivers for communication, and the like. In some implementations the software of an embedded system 6 includes an operating system (OS) and/or RTOS 22 and/or one or more applications 20 that may include a program or set of instructions stored in memory (memory 24 or some other memory) for use by the processor to manipulate the hardware 10 to complete the tasks that the embedded system 6 is requested to perform through the program. In some implementations the one or more applications 20 manipulate the hardware 10 directly. In some implementations the system 2/4 is designed with an RTOS 22 that allocates computing system resources to the one or more applications 20 and schedules and dispatches tasks that the embedded system 6 must perform as requested by the one or more applications 20.

In various implementations the HAL 8 and eHAL 14 each include data elements that can be included in programming elements (such as classes) to form abstract models of hardware 10 resources that make them more easily manipulated through code designed by a programmer or user.

In various implementations, the system 2 or 4 includes hardware and/or software that enables, during execution of the tasks of the embedded system 6, measurement of power use during operation of the embedded system 6, interpretation of those measurements and inference of energy use, a sequence of optimization steps to minimize energy use over all tasks performed by the embedded system 6, and implementation of those optimization steps via manipulation of the hardware 10.

In particular implementations the system 2/4 is a hardware and/or software extension of an embedded system. As an extension, the system 2/4 may monitor energy use of the embedded system and continuously adjust system 2/4 parameters in an attempt to improve energy efficiency of the embedded system. This process in implementations is done autonomously, freeing the designer or programmer from the task of manually optimizing embedded system performance during the program and/or application development stage. In various implementations the system 2/4 is implemented as a software library 16 under a portable application programming interface (API), allowing the system 2/4 to be used with a variety of heterogeneous devices, presenting an abstracted hardware interface (the eHAL 14) to the code of the one or more applications 20. In these implementations, because of the existence of the eHAL 14, the one or more applications 20 to not need to include code that handles the actual nature, type, and/or arrangement of the hardware components of the embedded system. In various implementations the system 2/4 may be capable of maintaining energy optimization throughout unforeseen usage conditions.

In various implementations the hardware abstraction may include the HAL 8, the eHAL 14, and device drivers or drivers for peripherals 28. The system 2/4 may include an operating system and an RTOS 22. The one or more applications 20 may include one or more user interfaces, may allow high-level device (or peripheral 28) control, and may facilitate task execution. The system 2/4 may provide a universal power management operating system layer. In particular implementations, the system 2/4 may treat energy/power as a centrally-managed operating system or RTOS 22 resource.

The system 2/4 may be embedded into smart appliances or other device or machine and the like to optimize energy efficiency of the embedded system 6 and the smart appliance or other device or machine. The system 2/4 and/or the hypervisor 18 and/or the eHAL 14 may be fully or partially implemented in the kernel stored in the embedded system 6. By "kernel" is meant a computer program that manages input/output requests from software and translates them into data processing instructions for a CPU and/or other electronic components of a computer or embedded system. In various implementations the RTOS 22 and/or the hypervisor 18 and/or the eHAL 14 manage and optimize energy use just as the RTOS 22 manages and optimizes the use of other resources (e.g., CPU time). The system 2/4 allows autonomous optimization of energy consumption based on the embedded system 6 hardware design and directives from a user such as an application programmer.

The system 2/4 includes an electronic circuit for sensing power use. In various implementations, the system 2 or 4 measures and/or estimates energy use of the embedded system 6 for execution of tasks using power use measurements and the time used to perform the tasks. Either or both of the eHAL 14 and hypervisor 18 are configured to measure and/or estimate energy consumption of the embedded system 6 in real time during execution of the tasks of the embedded system 6. The measurement of energy consumption of the embedded system 6 may incorporate any technique, method, implementing systems, and components disclosed in the Master of Engineering Thesis by Kenji. R. Yamamoto entitled "Manipulation of Energy Consumption in Time-Triggered Embedded Systems with Static Schedules," published by Northern Arizona University (May 2011), the disclosure of which is hereby incorporated entirely herein by reference. In particular implementations, the eHAL 14 and/or the hypervisor 18 may precisely measure energy consumption of the embedded system 6 across five orders of magnitude. The measurement of energy consumption may be done by decomposing operations of the embedded system 6 into chunks whose energy can be measured and/or using an optimization algorithm which utilizes dynamic programming. Any of the dynamic programming techniques described in the article included as Appendix A (the disclosure of which is incorporated entirely herein by reference) may be utilized for this purpose. Additionally, any of the dynamic programming techniques described in Dimitri. P. Bertsekas, Dynamic Programming and Optimal Control, Vol. II, 4th Edition: Approximate Dynamic Programming, Athena Scientific (2007) or Martin L. Puterman, Markov Decision Processes: Discrete Stochastic Dynamic Programming, Wiley (2005), the disclosures of each of which are entirely incorporated herein by reference, may be used.

The measurement of electrical energy consumption of the embedded system 6, which may be done by the eHAL 14 and/or the hypervisor 18, may include real-time sensing of activity of the embedded system 6 (such as the supply voltage or processing speed of the MCU processor 12, state of the on-chip and off-chip peripherals 28, and the like) as a function of time and associated energy use as a function of time and/or as a function of hypervisor 18 decisions. The measurement may measure energy use as a function of operating modes, peripheral 28 activation, supply voltages, clock frequencies, clock/power gating, and the like. The sensed data may be used to generate a model of electrical energy use. The various data elements composing the model may be stored in the memory 24 and/or in the eHAL 14 (such as in memory of the eHAL 14).

In particular implementations the energy consumption measurements may be done using a precision high-side power monitoring integrated circuit that interacts with the hypervisor 18 running on the MCU. By non-limiting example, a power measurement chip sold under the trade name INA219 by TEXAS INSTRUMENTS may be used and controlled with a low cost sensing and control interface with the MCU of the embedded system. In various implementations, this functionality may be integrated into the embedded system itself.

The system 2/4 derives energy use for execution of its tasks using power consumption measurements and measuring the time used to perform its tasks. In particular implementations, the measurement of power consumption is done by sensing the activity of the voltage regulation circuitry that powers the embedded system.

In various implementations, the system 2 or 4 generates an internal model of itself that is composed of tasks, hardware 10 subsystem parameters, and associated energy use as a function of the tasks and hardware 10 subsystem parameters. The system 2 or 4 may maintain the model in its storage facilities such as in memory 24 and this may allow comparison of energy use as parameters are varied. The overall energy use for operation of the system 2/4 may be minimized by selecting the sequence of parameters associated with the sequence of tasks.

An optimization algorithm may be used to find possible improvements in electrical energy efficiency based on the model of energy use. The system 2 or 4 may have a library of optimization algorithms pre-programmed into it prior to deployment, such as in the software library 16, and/or the system 2 or 4 may be configured to generate one or more optimization algorithms after deployment. Optimization algorithms, whether included prior to deployment of the embedded system 6 or generated by the system 2 or 4 after deployment, may utilize dynamic programming. The optimization algorithm(s) may be stored in the memory 24, or in the eHAL 14 (such as in memory of the eHAL 14), or in the hypervisor 18 (such as in memory of the hypervisor 18).

Once the optimization algorithm has found an optimized efficiency strategy or optimized efficiency settings, a control algorithm may be used to select new parameter settings for the MCU, embedded system 6, hardware 10 components, and peripherals 28. The system 2 or 4 may have a library of control algorithms pre-programmed into it prior to deployment, such as in the software library 16, and/or the system 2 or 4 may be configured to generate one or more control algorithms after deployment. Control algorithms, whether included prior to deployment of the embedded system 6 or generated by the system 2 or 4 after deployment, may utilize dynamic programming. The control algorithm(s) may be stored in the memory 24, or in the eHAL 14 (such as in memory of the eHAL 14), or in the hypervisor 18 (such as in memory of the hypervisor 18).

As the system 2 or 4 proceeds in the new configuration, sensing may be done occasionally, such as by/through the hypervisor 18 or the eHAL 14, to determine if another iteration of the process should be done to adjust the hardware 10 parameter settings and further optimize energy efficiency of the embedded system 6. In this way the optimization may be a continuous process by which the system 2 or 4 may evaluate the optimization and progressively reduce energy use over time and while the embedded system 6 is in use after deployment.

In various implementations the system 2/4 generates a sequence of optimization steps to minimize energy use across all tasks performed by the embedded system 6. The optimization algorithm may model energy or power usage as a function of operating modes, peripheral 28 activation, clock frequencies, clock/power gating, transitions between modes, activation or use of in-system devices, and the like.

In particular implementations, the system 2/4 constructs a model of itself which models energy use of tasks as a function of hardware 10 parameters. The hardware 10 parameters may include a list of subsystems that make up the hardware 10 and the parameters for each subsystem that can be manipulated to alter energy use during execution of a task, such as, by non-limiting example, supply or cut-off of power, supply voltage, presence or absence of clock signal that drives subsystem operation, enablement or disablement of clock source hardware, the clock frequency (if present), and other operational parameters of the various hardware components (or combinations of components).

The system 2/4 may control the parameters of the hardware 10 subsystems under the constraint of accomplishing the embedded system's tasks within given time limits. The parameters of each subsystem that can be manipulated may, in various implementations, include supply of power, supply voltage, clock signal presence or absence, clock source hardware, clock signal frequency (if present), and other operational parameters. In implementations the parameters are manipulated by storing values in registers 26 that control the parameters.

The hypervisor 18 in various implementations may be a system controller which is used to iteratively adjust operation parameters of the embedded system 6. In particular implementations the RTOS 22 depends on the hypervisor 18. In other words, while the RTOS 22 may supervise the one or more applications 20, the hypervisor 18 may supervise the RTOS 22. The RTOS 22 may provide resources requested by the one or more applications 20 by using system configuration choices made by the hypervisor 18. The hypervisor 18 searches for the highest energy efficiency such as by using the optimization algorithm(s) and, additionally, may measure and/or track energy use using abstract representations of the hardware 10 provided by the eHAL 14. The hypervisor 18 has complete "understanding" of the hardware 10 state of the embedded system 6 such as which peripherals 28 are active and, if so, their operating parameters as a function of time. The hypervisor 18 uses the eHAL 14 to manage, track, and optimize energy use as a service for the one or more applications 20 or the RTOS 22.

The system 2 or 4, including the hypervisor 18 and eHAL 14, uses energy itself. Accordingly, in implementations the system 2 or 4 is used for energy reduction only adaptively, i.e., only when efficiency improvements are likely to offset the energy cost of the optimization process. Once optimum settings have been found, the energy optimization can be suspended by the hypervisor 18 until changes in computational patterns occur (such as when a new or revised application or program is implemented on the embedded system or environmental changes cause processing activity to change on the embedded system). Thus, the hypervisor 18 may be configured to sense changes in computational patterns based on changes in the sensed data.

In various implementations the one or more applications 20 may access the hypervisor 18 directly. Thus the system 2/4 may be incorporated into computing systems in which one or more applications 20 run directly on the processor 12 hardware with no intervening layers of software. The system 2/4 may be incorporated into computing systems that use a software operating system (OS) or RTOS 22 to manage the system 2/4. Some applications 20 may be configured to perform their own resource management to avoid the overhead of an RTOS 22. The hypervisor 18 is a software interface that may be used with an RTOS 22 or directly by the applications 20. As previously, discussed, hypervisor 18 may track, manage and optimize energy use while providing services to the one or more applications 20 and/or to the RTOS 22.

In various implementations, the hypervisor 18 and/or eHAL 14 may, using the optimization algorithm, generate a sequence of optimization steps to determine the manipulations of the hardware 10 that will minimize energy use over the sequence of tasks performed by the system 2/4. The optimization steps may include, for instance, running certain tests to determine energy use required by certain tasks, such as, by non-limiting example, measuring energy use the next time that a certain task is done, and the like.

Just as an OS or RTOS 22 provides services to the embedded system 6 as it performs its tasks, the hypervisor 18 in various implementations may provide services to the OS or RTOS 22, using the eHAL 14 to manage, track and optimize energy use as a service for the RTOS 22 or one or more applications 20. It is possible for the one or more applications 20 to make requests directly to the hypervisor 18. This may be done, for example, where one or more of the applications 20 provides its own resource management without an RTOS 22. The hypervisor 18 thus may provide a software interface that can be used either with an RTOS 22 or directly.

In various implementations the RTOS 22 may be configured to exploit services provided by the eHAL 14 and the hypervisor 18 and follow orders from the hypervisor 18.

The eHAL 14 in various implementations reveals energy use and allows its control by measuring power consumption, interpreting power consumption measurements and inferring energy use, generating an optimization algorithm and/or otherwise determining how to optimize energy efficiency of the embedded system 6, and manipulating the hardware 10 to minimize energy use. In implementations the eHAL 14 is implemented as a software library 16 that is available to one or more applications 20 and/or to the RTOS 22 (which may be may be directly coupled to the eHAL 14). In various implementations the eHAL 14 includes a collection of simplified models that hide complex, distracting details of the underlying hardware 10 from a user or programmer In implementations the HAL 8 and eHAL 14 form two layers. The eHAL 14 may use/include software abstractions for MCU core parameters and heavily used peripherals 28 that reveal energy-related parameters and energy use.

The one or more applications 20 may request (or the RTOS 22 may provide to the or more applications 20) resources requested generically by the one or more applications 20 using hardware 10 configuration choices made by the hypervisor 18. The hypervisor 18 in various implementations may search for the highest energy efficiency while tracking energy use using models of the hardware 10 resources provided by the eHAL 14.

By non-limiting example, an MCU may have a plurality of energy-saving sleep or hibernation modes that reduce energy and have varying energy costs for wake-up depending on depth of sleep (i.e., which sleep or hibernation mode the MCU is in at the time wake-up is begun). A user may implement a constraint on the system 2 or 4, for instance requesting that the system 2/4 sleep for some period without requesting the exact sleep mode and with constraints related to which peripherals 28 must remain powered. The hypervisor 18 may select a specific sleep mode in combination with the eHAL 14 (or using data or algorithms provided by the eHAL 14) to accomplish the request to ensure that the most efficient sleep mode is selected depending upon the next step in the application or the most energy efficient sleep mode for the MCU overall (by non-limiting example). The hypervisor 18 may then implement the sleep mode by controlling the MCU registers 26. The system 2 or 4 may thus allow constraint-based optimization of energy use and optimization-driven control of MCU registers 26.

The system 2 or 4 may allow an embedded system 6 to optimize its own energy efficiency without any input from a user. In particular implementations, the system 2 or 4 may allow an embedded system 6 to optimize its own energy efficiency with only limited input from a user, such as constraints set at the time or prior to the time of deployment of the embedded system 6. After an embedded system 6 is deployed and in use, the system 2 or 4 may automatically and autonomously optimize the energy efficiency of the embedded system 6 and/or may optimize the energy efficiency of the embedded system 6 in response to changes in environment or operating conditions, even long after the embedded system 6 has been deployed.

The combination of a HAL 8 with an eHAL 14 may provide a streamlined interface to the processor 12 architecture and may enable fast portability of the system 2/4 software to new MCU architectures. By non-limiting example, in various implementations, the eHAL 14 may include MCU-specific functionality. This may allow all higher layers to be easily portable to new MCU families.

In various implementations, software versions of the hypervisor 18, eHAL 14, and/or other elements or implementing components of the system 2 or 4 may be implemented using executable software derived from programmer-developed code using the C or C++ programming languages, though many other programming languages may be used. In other implementations, executable hardware and firmware versions of the hypervisor 18, eHAL 14, and/or other elements or implementing components of the system 2 or 4 may be specified using the VHDL, Verilog, SystemC, or many other programming languages may be used.

In various implementations the HAL 8 is configured to arrange and control and direct the operation of one or more components of hardware 10, including peripherals 28, using the processor 12 included in the embedded system 6. The one or more applications 20 are configured to use the processor 12 to carry out one or more desired functions of the hardware 10. The eHAL 14 is configured to measure electrical energy use of the embedded system 6, generate a model of electrical energy use of the embedded system 6 and, using the model, determine how to one of reduce and minimize electrical energy use of the embedded system 6. The hypervisor 18 is configured to alter one or more hardware 10 parameters to one of reduce and minimize electrical energy use of the embedded system 6 as the embedded system 6 performs the one or more desired functions of the hardware 10 in response to instructions from the processor 12 executing the one or more applications 20.

Figure 3:
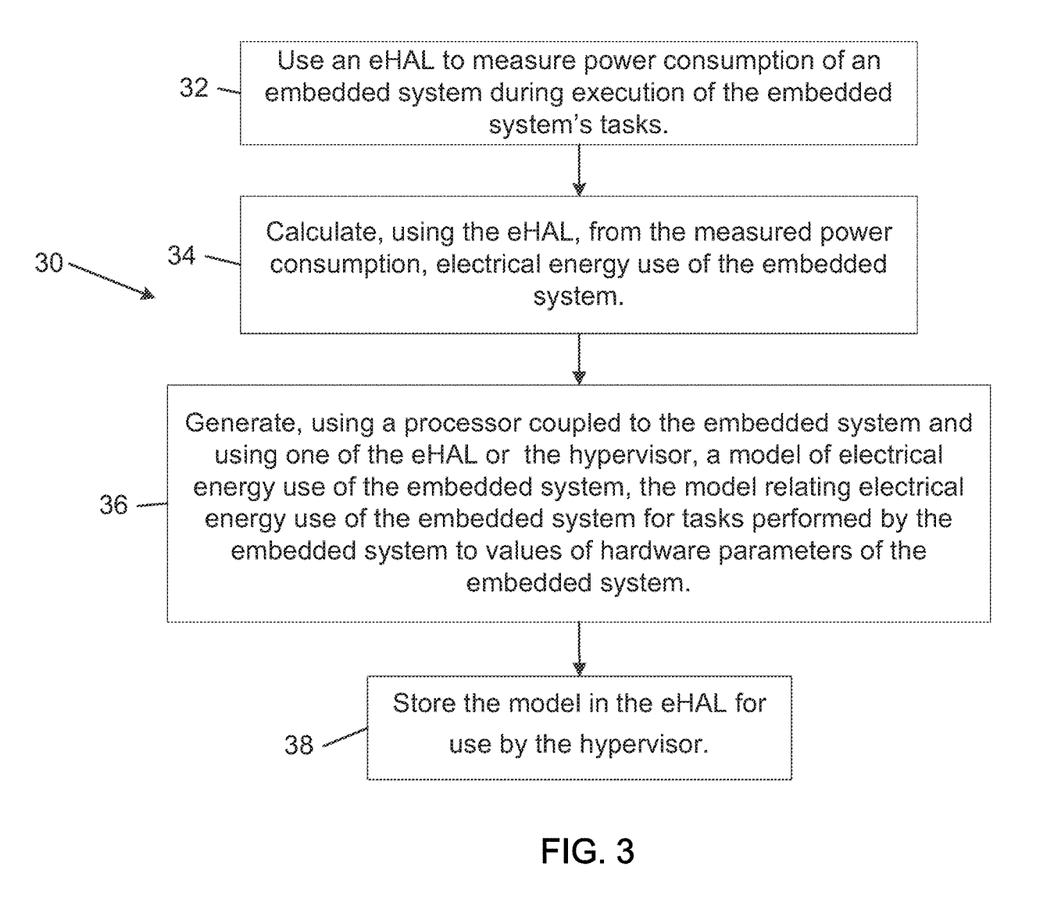
FIG. 3 is a flowchart of a method of optimizing energy efficiency for an embedded system.

Referring now to FIG. 3, implementations a method of optimizing energy efficiency for an embedded system 6 (method 30) may include: using an eHAL 14 to measure power consumption of the embedded system 6 during execution of the embedded system's tasks (step 32); calculating, using the eHAL 14, from the measured power consumption, electrical energy use of the embedded system 6 (step 34); generating, using a processor 12 coupled to the embedded system 6 and using the eHAL 14 and/or the hypervisor 18, a model of electrical energy use of the embedded system 6 (step 36), the model relating electrical energy use of the embedded system 6 for tasks performed by the embedded system 6 to values of hardware 10 parameters of the embedded system 6 and; storing the model in the eHAL 14 for use by the hypervisor 18 (step 38). Method 30 may also include modifying, using the processor 12 and using one of the eHAL 14 and the hypervisor 18, the model of electrical energy use of the embedded system 6 in response to determining a difference between a predicted electrical energy use based upon the model and a calculated electrical energy use of the embedded system 6.

Figure 4:
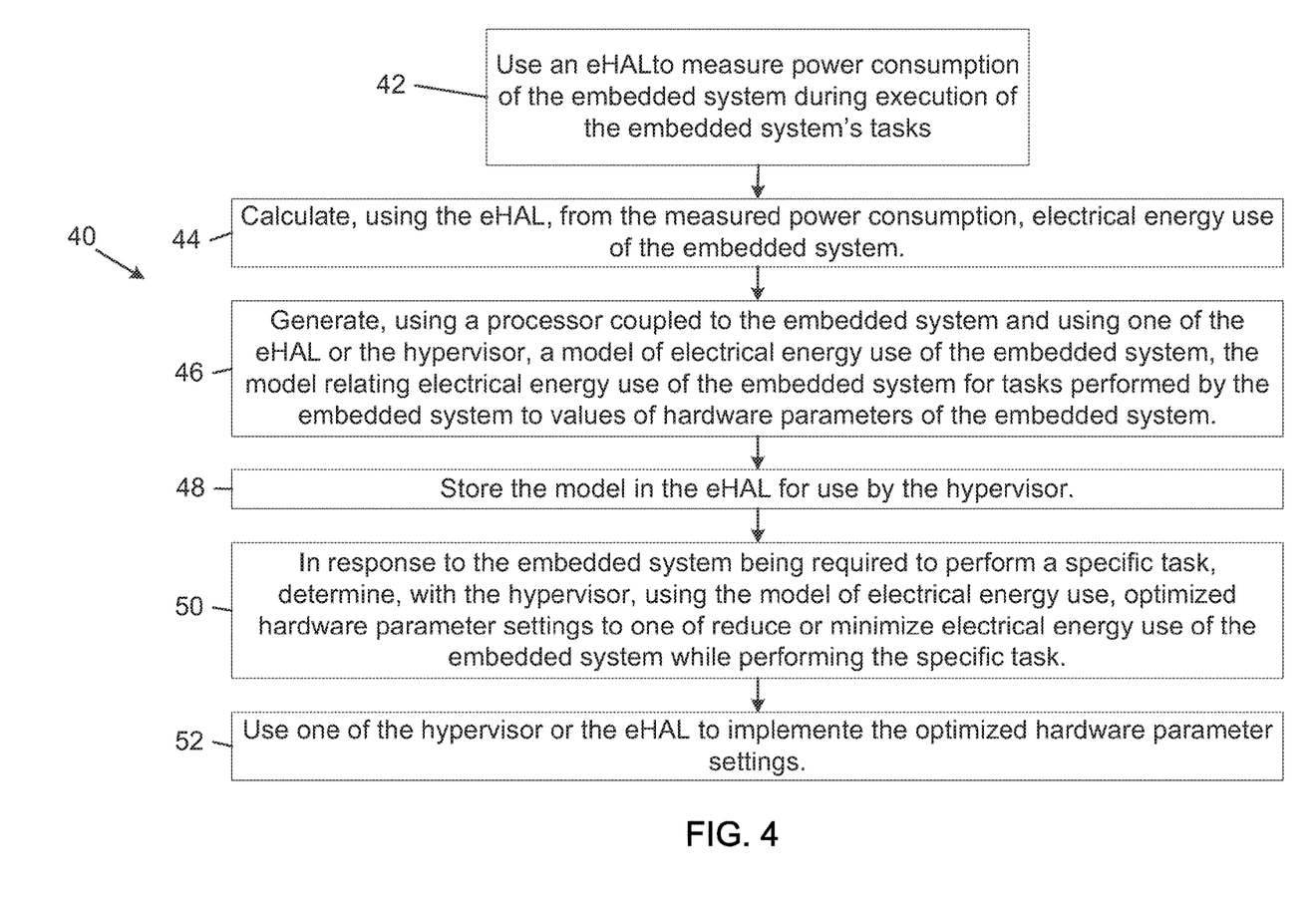
FIG. 4 is a flowchart of a method of real time energy efficiency optimization for an embedded system.

Referring to FIG. 4, implementations of a method of real time energy efficiency optimization for an embedded system 6 (method 40) may include: using an eHAL 14 to measure power consumption of the embedded system 6 during execution of the embedded system's tasks (step 42); calculating, using the eHAL 14, from the measured power consumption, electrical energy use of the embedded system 6 (step 44); generating, using a processor 12 coupled to the embedded system 6 and using the eHAL 14 and/or the hypervisor 18, a model of electrical energy use of the embedded system 6 (step 46); storing the model in the eHAL 14 for use by the hypervisor 18 (step 48); in response to the embedded system 6 being required to perform a specific task, determining, with the hypervisor 18, using the model of electrical energy use, optimized hardware 10 parameter settings to reduce or minimize electrical energy use of the embedded system 6 while performing the specific task (step 50), and; using the hypervisor 18 and/or the eHAL 14, implementing the optimized hardware 10 parameter settings (step 52).

Method 40 may also include determining, using the hypervisor 18, whether one or more optimization steps is likely to result in a net reduction in electrical energy use of the embedded system 6, taking into account an amount of electrical energy required to implement the one or more optimization steps. Method 40 may also include comparing, with one of the eHAL 14 and the hypervisor 18, a predicted electrical energy use with a calculated electrical energy use of the embedded system 6. The method 40 may also include, in response to comparing the predicted electrical energy use with the calculated electrical energy use of the embedded system 6, modifying the model using the eHAL 14. The method may also include, in response to comparing the predicted electrical energy use with the calculated electrical energy use of the embedded system 6, determining additional optimized hardware 10 parameter settings to one of reduce and minimize electrical energy use of the embedded system 6 and, using one of the eHAL 14 and the hypervisor 18, implementing the additional optimized hardware 10 parameter settings. In response to a change in the embedded system's operating environment, the method 40 may include automatically re-measuring, using the eHAL 14, power consumption of the embedded system 6 during execution of the embedded system's tasks; re-calculating, using the eHAL 14, from the re-measured power consumption, electrical energy use of the embedded system 6; determining, using the eHAL 14, additional optimized hardware 10 settings to one of reduce and minimize electrical energy use of the embedded system 6; and, using one of the eHAL 14 and the hypervisor 18, implementing the additional optimized hardware 10 parameter settings.

In implementations the entire system 2 or 4 may be implemented using hardware. In implementations the entire system 2 or 4 may be implemented using hardware and software underneath the one or more applications 20. In implementations the eHAL 14 provides a model of the hardware 10 and its energy use to the hypervisor 18, thus extending the model of a HAL 8 which provides a model of the hardware 10 alone (i.e., without providing a model of the energy use of the hardware 10) to the operating system or RTOS 22. In implementations the HAL 8 may provide an abstract model of the complex hardware 10 that captures its essential aspects and hides unneeded details. The HAL 8 may make it easier for an operating system or application programmer to write code for the embedded system 6.

In implementations the hypervisor 18 provides, as a service to the RTOS 22, operating system or one or more applications 20, optimization of energy use. In implementations the hypervisor 18 does this by manipulating the parameters of the system hardware 10 via the HAL 8 and the eHAL 14. In implementations the eHAL 14 provides measurements needed for the hypervisor 18 to do the optimization, and an abstract representation of the "levers" needed by the hypervisor 18 to control and/or manipulate the parameters of the hardware 10 to implement the optimization. Nevertheless, in implementations the entire system 2 or 4 could be implemented without an eHAL 14, just as some embedded systems are programmed without the benefit of a HAL 8 (in which case a programmer may directly manipulate bits in a register 26 to control the hardware 10). In particular implementations the eHAL 14 does not include a software library 16, though in implementations this may be an efficient method of making software portable to new systems and applications.

In places where the description above refers to particular implementations of systems and methods for optimizing energy efficiency in programmable devices and implementing components, sub-components, methods and sub-methods, it should be readily apparent that a number of modifications may be made without departing from the spirit thereof and that these implementations, implementing components, sub-components, methods and sub-methods may be applied to other systems and methods for optimizing energy efficiency in programmable devices.

What is claimed is:

1. A system for optimizing energy efficiency of an embedded system, comprising:
    a hardware abstraction layer (HAL) coupled to hardware of the embedded system, the HAL configured to arrange control and direct the operation of one or more components of hardware of the embedded system using a processor comprised in the embedded system;
    an energy hardware abstraction layer (eHAL) coupled to the hardware of the embedded system and to the HAL;
    a hypervisor coupled to the HAL and to the eHAL; and
    one or more applications, the one or more applications coupled to the hypervisor, the HAL and the eHAL, the one or more applications configured to use the processor to carry out one or more desired functions of the hardware of the embedded system;
    wherein one of the eHAL and the hypervisor is configured to measure electrical energy use of the embedded system, generate a model of electrical energy use of the embedded system and, using the model, determine how to one of reduce or minimize electrical energy use of the embedded system;
    wherein the hypervisor is configured to alter one or more hardware parameters to one of reduce or minimize electrical energy use of the embedded system as the embedded system performs the one or more desired functions of the hardware in response to instructions from the processor executing the one or more applications; and
    wherein the HAL does not comprise an operating system (OS); and
    wherein the system for optimizing energy efficiency does not comprise an operating system.

2. The system of claim 1, further comprising a real time operating system (RTOS) coupled only to the one or more applications and to the hypervisor.

3. The system of claim 2, wherein the eHAL comprises a software library that is available to the RTOS.

4. The system of claim 1, wherein the eHAL comprises a software library that is available to the one or more applications.

5. A method of optimizing energy efficiency for an embedded system, comprising:
    using an energy hardware abstraction layer (eHAL) of an embedded system to measure power consumption of the embedded system during execution of the embedded system's tasks, the embedded system comprising: hardware, a hardware abstraction layer (HAL) coupled to the hardware, the eHAL coupled to the hardware and to the HAL, a hypervisor coupled to the HAL and to the eHAL, and at least one application coupled to the hypervisor and to the HAL and the eHAL;
    calculating, using one of the eHAL or the hypervisor, from the measured power consumption, electrical energy use of the embedded system;
    generating, using a processor coupled to the embedded system and using one of the eHAL or the hypervisor, a model of electrical energy use of the embedded system, the model relating electrical energy use of the embedded system for tasks performed by the embedded system to values of hardware parameters of the embedded system; and
    storing the model in the eHAL for use by the hypervisor;
    wherein the HAL does not comprise an operating system (OS).

6. The method of claim 5, further comprising providing a real time operating system (RTOS) coupled only to the at least one application and to the hypervisor.

7. A method of optimizing energy efficiency for an embedded system, comprising:
    using an energy hardware abstraction layer (eHAL) of an embedded system to measure power consumption of the embedded system during execution of the embedded system's tasks, the embedded system comprising: hardware, a hardware abstraction layer (HAL) coupled to the hardware, the eHAL coupled to the hardware and to the HAL, a hypervisor coupled to the HAL and to the eHAL, and at least one application coupled to the hypervisor and to the HAL and the eHAL;

calculating, using one of the eHAL or the hypervisor, from the measured power consumption, electrical energy use of the embedded system;

generating, using a processor coupled to the embedded system and using one of the eHAL or the hypervisor, a model of electrical energy use of the embedded system, the model relating electrical energy use of the embedded system for tasks performed by the embedded system to values of hardware parameters of the embedded system;

storing the model in the eHAL for use by the hypervisor; and modifying, using the processor coupled to the embedded system and using one of the eHAL or the hypervisor, the model of electrical energy use of the embedded system in response to determining a difference between a predicted electrical energy use based upon the model and a calculated electrical energy use of the embedded system.

8. A method of real time energy efficiency optimization for an embedded system, comprising:

using an energy hardware abstraction layer (eHAL) of an embedded system to measure power consumption of the embedded system during execution of the embedded system's tasks, the embedded system comprising: hardware, a hardware abstraction layer (HAL) coupled to the hardware, the eHAL coupled to the hardware and to the HAL, a hypervisor coupled to the HAL and to the eHAL, a real time operating system (RTOS) coupled only to the hypervisor and at least one application, the at least one application coupled to the hypervisor and to the RTOS, the HAL and the eHAL;

calculating, using one of the eHAL, the hypervisor or both the eHAL and the hypervisor, from the measured power consumption, electrical energy use of the embedded system;

generating, using a processor coupled to the embedded system and using one of the eHAL or the hypervisor, a model of electrical energy use of the embedded system, the model relating electrical energy use of the embedded system for tasks performed by the embedded system to values of hardware parameters of the embedded system;

storing the model in the eHAL for use by the hypervisor;

in response to the embedded system being required to perform a specific task, determining, with the hypervisor, using the model of electrical energy use, optimized hardware parameter settings to one of reduce and minimize electrical energy use of the embedded system while performing the specific task; and using one of the hypervisor or the eHAL, implementing the optimized hardware parameter settings;

wherein the HAL does not comprise an operating system (OS).

9. The method of claim 8, wherein the hardware parameters are selected from the group consisting of power supply to one or more hardware subsystems, supply voltage to the one or more hardware subsystems, presence of clock signal that drives subsystem operation, enablement or disablement of clock source hardware, clock frequency, any parameter that affects power consumption of the one or more hardware subsystems, and any combination thereof.

10. The method of claim 8, further comprising, in response to a change in the embedded system's operating environment:

automatically re-measuring, using the eHAL, power consumption of the embedded system during execution of the embedded system's tasks;

re-calculating, using one of the eHAL or the hypervisor, from the re-measured power consumption, electrical energy use of the embedded system;

determining, using one of the eHAL or the hypervisor, additional optimized hardware parameter settings to one of reduce or minimize electrical energy use of the embedded system; and, using one of the eHAL or the hypervisor, implementing the additional optimized hardware parameter settings.

11. The method of claim 8, wherein implementing the optimized hardware parameter settings comprises storing data values in registers in memory comprised in the embedded system.

12. The method of claim 8, wherein determining, with the hypervisor, optimized hardware parameter settings further comprises determining optimized hardware parameter settings within one or more constraints.

13. The method of claim 8, further comprising making a request, with the at least one application, directly to the hypervisor.

14. The method of claim 8, wherein one of generating the model of electrical energy use of the embedded system or determining the optimized hardware parameter settings comprises dynamic programming.

15. A method of real time energy efficiency optimization for an embedded system, comprising:

using an energy hardware abstraction layer (eHAL) of an embedded system to measure power consumption of the embedded system during execution of the embedded system's tasks, the embedded system comprising: hardware, a hardware abstraction layer (HAL) coupled to the hardware, the eHAL coupled to the hardware and to the HAL, a hypervisor coupled to the HAL and to the eHAL, a real time operating system (RTOS) coupled only to the hypervisor and at least one application, the at least one application coupled to the hypervisor and to the RTOS, the HAL and the eHAL;

calculating, using one of the eHAL, the hypervisor or both the eHAL and the hypervisor, from the measured power consumption, electrical energy use of the embedded system;

generating, using a processor coupled to the embedded system and using one of the eHAL or the hypervisor, a model of electrical energy use of the embedded system, the model relating electrical energy use of the embedded system for tasks performed by the embedded system to values of hardware parameters of the embedded system;

storing the model in the eHAL for use by the hypervisor;

in response to the embedded system being required to perform a specific task, determining, with the hypervisor, using the model of electrical energy use, optimized hardware parameter settings to one of reduce or minimize electrical energy use of the embedded system while performing the specific task;

using one of the hypervisor or the eHAL, implementing the optimized hardware parameter settings; and comparing, with one of the eHAL or the hypervisor, a predicted electrical energy use with a calculated electrical energy use of the embedded system.

16. The method of claim 15, further comprising, in response to comparing the predicted electrical energy use with the calculated electrical energy use of the embedded system, modifying the model using one of the eHAL or the hypervisor.

17. The method of claim 15, further comprising, in response to comparing the predicted electrical energy use with the calculated electrical energy use of the embedded system, determining additional optimized hardware parameter settings to one of reduce and minimize electrical energy use of the embedded system and, using one of the eHAL or the hypervisor, implementing the additional optimized hardware parameter settings.

* * * * *